(12) United States Patent
Jackson et al.

(10) Patent No.: US 10,913,161 B2
(45) Date of Patent: Feb. 9, 2021

(54) ROBOTICS SKIN SYSTEM WITH INTEGRAL ELASTOMERIC LINKS TO COMPLETE MECHANICAL LINKAGES

(71) Applicant: DISNEY ENTERPRISES, INC., Burbank, CA (US)

(72) Inventors: Philip John Jackson, Glendale, CA (US); Todd P. Camill, La Crescenta, CA (US); Anthony D. Martin, Huntington Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 242 days.

(21) Appl. No.: 16/207,291

(22) Filed: Dec. 3, 2018

(65) Prior Publication Data

US 2020/0171669 A1 Jun. 4, 2020

(51) Int. Cl.
| | | |
|---|---|---|
| *B25J 11/00* | (2006.01) | |
| *A63H 3/36* | (2006.01) | |
| *B29C 39/10* | (2006.01) | |
| *F16H 21/44* | (2006.01) | |
| *B29L 31/00* | (2006.01) | |

(52) U.S. Cl.
CPC ............ *B25J 11/0015* (2013.01); *A63H 3/36* (2013.01); *A63H 3/365* (2013.01); *B29C 39/10* (2013.01); *F16H 21/44* (2013.01); *B29L 2031/702* (2013.01)

(58) Field of Classification Search
CPC . A63H 3/36; A63H 3/365; A63H 9/00; A63H 3/20; B25J 11/0015; B29C 39/10; F16H 21/44; B29L 2031/702
See application file for complete search history.

(56) References Cited

U.S. PATENT DOCUMENTS

| | | | | | |
|---|---|---|---|---|---|
| 3,014,312 | A | * | 12/1961 | Convertine | ............ A63H 3/001 446/295 |
| 3,445,955 | A | * | 5/1969 | Mucciante | ............... A63H 3/24 446/183 |

(Continued)

OTHER PUBLICATIONS

Hanson, D. "Applications of EAP to the Entertainment Industry," in: Bar-Cohen, Y., Electroactive Polymer (EAP) Actuators as Artificial Muscles: Reality, Potential, and Challenges [Online]. 2nd ed. Bellingham, WA, SPIE Press, 2004 http://www.knovel.com, pp. 640-642, 649-653.

(Continued)

*Primary Examiner* — Eugene L Kim
*Assistant Examiner* — Alyssa M Hylinski
(74) *Attorney, Agent, or Firm* — Snell & Wilmer L.L.P.; Kent A. Lembke

(57) ABSTRACT

A skin or skin system for a robot or robotics assembly is provided that includes one or more integral elastomeric links (or bars) ("IELs") that are configured for receiving and connection with coupling elements or members (e.g., pivot pins) at the ends of mechanical links/bars. The IELs are also configured to act as a final link of a mechanical linkage made up of these mechanical links to provide a closed chain. For example, the body of each of the IELs, or a portion of the IEL body extending between connection points with the coupling elements of the links/bars of the mechanical linkage, provides a final link in a mechanical linkage forming a closed chain to allow it properly function.

19 Claims, 12 Drawing Sheets

(56) References Cited

U.S. PATENT DOCUMENTS

| | | | | |
|---|---|---|---|---|
| RE27,216 E | * | 11/1971 | Empsonhg | F16G 13/14 |
| | | | | 59/78 |
| 4,207,704 A | * | 6/1980 | Akiyama | G09B 23/36 |
| | | | | 360/79 |
| 4,683,669 A | * | 8/1987 | Greer, Jr. | A63H 3/365 |
| | | | | 40/414 |
| 7,113,848 B2 | * | 9/2006 | Hanson | G06N 3/008 |
| | | | | 700/245 |
| 8,568,642 B2 | * | 10/2013 | Jackson | B29C 39/10 |
| | | | | 264/277 |
| 9,403,099 B2 | * | 8/2016 | Tye | A63H 9/00 |
| 2002/0111112 A1 | * | 8/2002 | Willett | A63H 3/40 |
| | | | | 446/330 |
| 2003/0110540 A1 | | 6/2003 | Fukui et al. | |
| 2009/0202854 A1 | | 8/2009 | Jackson | |
| 2009/0289391 A1 | | 11/2009 | Tye et al. | |

OTHER PUBLICATIONS

"Mount" in: The Penguin English Dictionary [Online], Nov. 29, 2012, http://www.credoreference.com/entry/penguineng/mount.

\* cited by examiner

ROBOTICS SKIN SYSTEM WITH INTEGRAL ELASTOMERIC LINKS TO COMPLETE MECHANICAL LINKAGES

BACKGROUND

1. Field of the Description

The present description relates, in general, to designs for creating realistic skin or skin systems for robots or for use with robotics or other applications in which skin or similar coverings are applied (e.g., robotics used to simulate movement of a human's or a character's face, hands, or other body parts). More particularly, the description is directed to skin systems or skins for applying over robotics (and fabrication methods and completed robots/robotics devices with such skins) that facilitate connection of the skin systems/skins to robotic actuators or drivers and particularly to coupling members (e.g., pivot pins) at the ends of links/bars of mechanical linkages of the robotics (or its drivers or actuators) used to drive or animate the skin systems/skins. Preferably, the new skin systems/skins are designed to enhance durability of the skin systems/skins while also providing more realistic skin movements such as facial expressions or movement while the character is "speaking" (e.g., providing natural lip, mouth, and surrounding facial feature movement when a robotic head is operated to simulate speaking).

2. Relevant Background

Durable materials that are often also flexible and elastic such as plastics and rubbers are used in many applications to create coverings or skins that are applied over an internal physical support structure or skeleton. For example, skins or skin systems are used to create realistic models of humans, animals, and characters, and, when combined with robotics, such models may accurately simulate live beings.

Robotics involves the design and use of robots to provide programmable actuators and/or drivers to perform tasks without human intervention, and there have been significant demands for robotic devices (or robots as these terms may be used interchangeably) that simulate humans, animals, and other living beings or characters. These robotic characters are relied upon heavily in the entertainment industry such as to provide special effects for movies and television and to provide robots for use in shows and displays in amusement or theme parks. For example, robotics may be used to provide a character in a theme park ride or show that repeats a particular set of movements or actions (e.g., programmed tasks) based on the presence of guests or a ride vehicle or based on another triggering event.

It is likely that the interest in robotics will continue to expand in the coming years, and a growing area of interest is how to provide robots that appear more realistic. Many robotics companies have focused on creating robots with software, processing hardware, and mechanical actuators or drivers, including mechanical linkages, which allow the robots to behave more like the natural creature that is being simulated. Much work has been done to create robots that can move and even behave similar to humans such as by manipulating objects with mechanical assemblies that behave like hands configured to be human-like. Significant effort has also been directed to providing robots with realistic facial animation such as having a robot open and close its mouth to provide lip synchronization with output audio (e.g., with speech) and by providing particular facial movements including eye movement such as frowning, smiling, and the like.

While many advances have been made in realistically simulating the physical movement and facial movement of a character, problems with maintaining a realistic or desired movement or facial animation still occur when the robotics (e.g., internal components of a robot including mechanical/structural portions as well as software, hardware, power systems, and the like) are covered with a skin or skin system. For example, a robot used to simulate a particular creature would be covered with skin or a covering assembly to imitate the natural or desired covering for the creature such as skin and fur/hair for many creatures, clothes for some creatures such as humans or characters (e.g., characters from animated films or television or puppets), or more fanciful covering system such as a metallic suit or any other desired covering.

In simulating humans or human-like characters, the robotics are typically covered in a skin that is fabricated of flexible material to move naturally with the underlying robotics. The skin may be formed of a rubber material or a silicone that is attached or anchored to the mechanical actuators or drivers of the robotic system (e.g., to a link or bar of a mechanical linkage), and the skin is configured to have an outward appearance similar to the character or creature being simulated by the robot. For example, the facial skins can be formed so as to have an uncanny resemblance to the character (or person) they are imitating, but often this resemblance ends when the attached robotics begin animating the face. The connection or anchoring points become apparent as the skin is pulled or pushed from behind. Additionally, the movement may be undesirably localized with movement only at the point of attachment, whereas a human face generally stretches and contracts more as a unit (or the movement is more widespread across the face). For example, a human's skin around their nose and eyes may move when skin around the mouth moves while a robotic skin may only move near the connection point with the manipulating robotics.

In the past, a skin system for a robot often was made using a manual process relying on the skill and experience of the craftsperson creating the skin and requiring many man-hours to prototype and later fabricate based on the prototype. In these processes, a sculpture is created, such as from clay or other moldable/shapeable materials, to represent the exterior skin shape (e.g., a person's face, a character from a movie, and so on). The sculpture is then molded, and sheet wax or a layer of clay is laid by hand into this exterior mold to define a desired thickness for the exterior skin layer. An interior core is then fabricated by hand such as by using fiberglass and resin. Fiberglass or a similar material is used to form a mold from this core, and hard shells, e.g., fiberglass shells to support the skin when the robot is later assembled, are then created from this core mold. An exterior skin can finally be formed by pouring a rubber or other flexible material into the gap between the exterior mold (with the sheet wax removed) and the core mold. After it is set, the skin is removed from the molds and placed on the supporting or hard shell(s) and attached to portions of the robotics (e.g., attached to a link or bar of a mechanical linkage or to the end of a driven rod).

As discussed above, the realism of the movement of the skin may be spoiled as the skin moves more or unrealistically at the connection point between the skin and the robotic driver or actuator. In some cases, the connection points are provided after the skin is removed from the mold.

Application of the connection points may involve gluing a dot or connection point component onto the inner surfaces of the skin, and then connecting the connection point component to the robotics. For example, the connection point may be configured as a socket of a rubber or soft material similar to that of the skin, and the robotic actuator may have a ball-shaped head at the end of a driven rod so as to provide a ball and socket-type attachment at this point of the skin when it is inserted into the connection point component. Glue may also be used to bond snaps, Velcro or similar fabric, metal/plastic plates with holes, and the like onto the inner or back surface of the skin that then mates with the robotic actuators so as to affect skin movement. Instead of using glue, some mounting techniques call for melting the hardened skin and then adding snaps or pads to the skin surfaces.

These techniques for providing connections between the skin and robotics have not been entirely successful in meeting the needs of the robotics industry. Each of these processes is post-skin making such that the connecting components will often not affectively stand up under ongoing wear and tear of a repeated motion of the underlying or driving robotics. The non-integral components, which are often of an incompatible or non-similar material, tend to tear or work their way out of the skin or break the glue-based bonding to the skin. The use of dot or point connection points often will not provide a realistic movement of the skin as the forces applied by the robotics actuators or drivers are applied as point forces. Since the connection point components are added after the skin is removed from the core and mold, the application of the connectors often relies on the skill and experience of the artisan, and it is difficult to accurately position each of the connectors so as to obtain a desired and predictable connection location on the skin surface with the robotics (e.g., two people may glue the same connection component at two slightly offset locations so as to create differing skin movements with similar robotics actuation).

The skin system designs of U.S. Pat. No. 8,568,642, which is incorporated herein in its entirety, attempted to address the above problems associated with providing a skin or skin system that can be used to cover a robotics device such as a head and connect with actuators or drivers of the robotics device so as to move in a more realistic manner. Particularly, a skin fabricating method was taught that includes determining desired and useful connection points for the skin with a robotics shell (e.g., an outer shell in which one or more robotics driver or actuator is housed) and for the skin with robotics drivers via such a shell. A core or inner skin mold was provided that included posts or connectors similar to those used to link/connect the skin with the shell and/or robotics drivers (e.g., actuators including rods with balls at their ends or the like).

U.S. Pat. No. 8,568,642 teaches that elastomeric actuation points or pieces (EAPs) are positioned on each of these core posts/connectors. The core is then enclosed in an external skin mold assembly, which defines a cavity about the outer surfaces of the core and its EAP-covered posts/connectors, and a pour is performed to fill the cavity with a volume of a rubber, silicone, or other skin-forming material. The material is allowed to harden, and, during such hardening, a skin or skin system is formed in which the EAPs are integrally formed or bonded. Once hardened, the mold is disassembled and the skin removed from the core with the EAPs permanently in place and ready for use. In some embodiments, the described fabrication method further included applying the skin over a robotics assembly with each of the EAPs connected to either the robotics outer shell or a robotics driver/actuator or link element to such driver/actuator.

In contrast to the more manual post-skin forming techniques, the skin fabricating method described in U.S. Pat. No. 8,568,642 provided the EAPs as part of the skin making process in a highly accurate way (e.g., the EAPs are accurately positioned on the inner or back surface of the skin using the core's posts/connectors). EAPs with differing shapes were utilized to enhance a particular desired skin movement in a specific area of the skin system and/or its underlying robotics. For example, smaller circular (or other shaped) buttons were used to provide robotics shell to skin connection locations, and such EAPs may be considered "locking EAPs." Another set of EAPs were connected to the robotics actuators/drivers and typically were larger in size than the locking EAPs. These EAPs were labeled "force-distributing EAPs" (or "load-spreading EAPs") and took on differing shapes and sizes (and/or one, two, or more materials with differing hardnesses such as two, three, or more durometer hardnesses such as with a hardened (e.g., vulcanized rubber) core for mating with robotics and a softer surrounding body (e.g., foam silicone or the like) with an even softer (lower hardness) tip(s) or wing(s)) from each other and/or from the locking EAPs so as to better distribute forces throughout the skin material to which these EAPs are integrally bonded when they are selectively, mechanically actuated with the robotics.

The integral bonding of the EAPs, which preferably have shapes that are sympathetic with the skin features or components being driven (such as two or more spaced apart EAPs with wings extending out from a circular body being used to distribute force in a lip rather than a single large tube), facilitated realistic skin movement. The bonded-in-skin material (rubber or the like) EAPs were found to be extremely durable, which means that the skin lasts longer when compared with glued on sockets or the like. This reduced maintenance requirements and eliminated the need for frequent replacement of skins, which lowered overall costs of such skin systems. The bond between the skin material and the surfaces of each EAP was also far superior to that achieved with an adhesive.

At least one challenge remains in providing a realistic skin system even after the creation of skin systems with EAPs. The skin systems often have to be very small in size, and this size limitation can make it difficult to mate a mechanical linkage with a skin system in a manner that meets the size requirements, that still achieves realistic skin movements, and that provides a durable skin-to-robotics coupling.

SUMMARY

The inventors discovered that a link or bar of a mechanical linkage of a robotics actuator or driver can be provided with a new integral elastomeric link (or bar) ("IEL") that also takes the place of an EAP to provide the skin-to-robotics connection point. In brief, a skin or skin system is provided that includes one or more IELs that are configured for receiving and connection with coupling elements or members (e.g., pivot pins) at the ends of mechanical links/bars and are also configured to act as a final link/bar of a mechanical linkage made up of these mechanical links/bars to provide a closed chain. For example, the body of each of the IELs (or a portion of the IEL body extending between connection points with the coupling elements of the links/bars of the mechanical linkage) provides a final link in a mechanical linkage forming a closed chain to allow it to properly function (e.g., the mechanical linkage does not operate without the IEL connected to the coupling element (e.g., pivot pins)).

FIG. 1 illustrates a robot or robotic device 100 formed using an EAP-based skin system 130. Particularly, the robot 100 includes robotics 110 enclosed within or supported in a rigid outer shell 111, and a prior art skin system 130 is used to cover the shell 111 and robotics 110 with an outer surface 131 facing outward away from the robotics 110 and an inner surface 132 abutting and mating with outer surfaces of the shell 111. The skin system 130 is formed from silicone or other flexible materials as discussed for example with reference to U.S. Pat. No. 8,568,642 so as to include a plurality of EAPs for use in connecting the skin system 130 to the shell 111 and robotics 110.

Particularly, the robotics 110 includes drivers or actuators for a pair of mechanical linkages 112, 120 that are used to animate or move the skin system 130 such as by moving the lips 133, 134 to simulate speech. In each of the lips 133, 134, the skin system 130 includes EAPs 136, 138 that are integrally formed with the skin system 130 and are embedded in the lips 133, 134 with an exposed recessed surface 137, 139 for receiving and mating with the drivers 112, 120. Each mechanical linkage 112, 120 includes links or bars 113, 114, 116, and 118 and 122, 124, 126, and 128. Link/bar 118 (and 128) in this example is a toothed component that is pivotally coupled to the ends of the links/bars 114, 116 (and 124, 126) via pivot pins 115, 117 (and 125, 127), respectively, that extend through the body of the link/bar 118 (and 128), which is inserted into the recessed surface 137 (and 139). The teeth of the link/bar 118 (and 128) mate with the sidewalls in recessed surface 137 (and 139) to hold the link/bar 118 (and 128) in place and to cause the EAP 136 (and 138) to move with link/bar 118 (and 128) when the mechanical linkage 112 (and 120) is moved by one or more drivers or actuators of the robotics 110. The link/bar 118 (and 128) is typically formed of a material such as a metal that is more rigid than the receiving EAP 136 (and 138).

FIG. 2 is an enlarged view of the mechanical linkage 112 of the robotics 110 of robot 100 showing more details including the inner pivot pins 254, 255 that pivotally couple the links/bars 114, 116 at their inner ends to the link/bar 113. The robotics 110 is formed of many metal links that form closed chains. As an example, the mechanical linkage 112 includes links/bars 113, 114, 116, and 118 that function to provide the closed chain 250 outlined or represented by lines 252, 256, 258 and 260. In this prior mechanical linkage 112, the link or bar 118 is a metal gear-shaped piece that closes the chain 250 as shown with line 260 within the upper lip 133 of the skin system 130 providing an animated figure's face. As seen in FIG. 1, the EAP 136 that is embedded in the skin system 130 snaps around the gear-shaped link 118 and moves with it as the mechanism or mechanical linkage 112 moves (in response to operation of a driver/actuator of the robotics 110).

With the new skin system with its IELs, a skin-covered robotic apparatus can be provided that has realistic movements even when relatively small volumes of skin material or skin portions are mechanically moved or actuated. The apparatus includes a robotics assembly including a mechanical linkage comprising a first link with a first coupling element and a second link with a second coupling element. The apparatus also includes a skin system including a thickness or layer of flexible material with an outer surface and an inner surface. The skin system is applied over the robotics assembly with the inner surface facing the mechanical linkage.

Significantly, the skin system further includes an integral elastomeric link (IEL) with a body embedded in and integrally bonded to the flexible material of the layer of the skin system. The first and second coupling elements are connected to the body of the IEL, and the body of the IEL provides a third link of the mechanical linkage. As a result, the mechanical linkage has a closed chain when the first and second coupling elements are connected to the body of the IEL Typically, the body of the IEL is formed of an elastomeric material, and the body has a hardness greater than a hardness of the flexible material of the layer of the skin system. For example, the hardness may be greater than 50 Shore A (such as about 75 Shore A or the like), and this is useful when the elastomeric material is silicone. In some embodiments, the first and second links are rigid and wherein the first and second coupling elements are pivot pins. In such embodiments, the body of the IEL may include two spaced apart end walls each with a pair of spaced apart holes for receiving ends of the pivot pins.

Further, the pivot pins may be pivotally supported within the holes of the end walls, whereby inner surfaces of the holes in the end walls are bearing surfaces for the pivot pins during operations of the robotics assembly to drive the mechanical linkage and move the skin system. The end walls can each be cylindrically shaped with a thickness greater than about 25 percent of a length of the pivot pins. In such cases, the body of the IEL may include a connecting portion extending between edges of the end walls, and a gap can be provided or formed in the body between inner surfaces of the end walls. Further, the gap can be exposed on the inner surface of the skin system for receiving the pivot pins, and the gap may have a width greater than about 25 percent of the length of the pivot pins (to allow it to be "opened" by a technician applying the skin system over the robotics assembly and have the end walls then "snap" back to an at-rest state to retain the pivot pins in the body of the IEL) Also, in such embodiments, the body may have a length, as measured between outer surfaces of the end walls, which is less than about 9 millimeters.

DETAILED DESCRIPTION OF THE PREFERRED EMBODIMENTS

Briefly, a new skin system design is provided that includes integral elastomeric links (IELs) that are formed with the skin or skin system such that the IELs are embedded into the skin to be bonded to surrounding portions of the skin. Each IEL is configured to provide an attachment point for coupling elements or members (such as pivot pins or the like) of links/bars of a mechanical linkage of robotics when the skin system is applied over the robotics (or over a shell containing or supporting the robotics), thereby connecting the skin system to the robotics at the location of the IEL. Further, though, each IEL is configured to function as or provide a link or bar of the mechanical linkage so as to form a closed chain to allow the mechanical linkage to work properly. In this way, the IEL takes the place of and obviates the need for one of the links or bars previously provided in conventional robotics so as to simplify construction of the robotics, reduce cost of the robotics, and allow the connection to and driving of the skin to be achieved in much smaller spaces (such as a life-sized lip of a human face or the like).

The inventors were faced with the design problem of enabling highly realistic movements of animatronic characters or robots (or robot devices) with flexible skin within the size and shape limitations of human or character form. It was discovered by the inventors that it was possible and useful to create the mechanisms, which were often tiny in size, needed to move skin realistically by replacing some of the traditional links or bars of the mechanical linkages with embedded links (i.e., the IELs described herein) formed of material matching or similar to that of flexible skin materials of the skin system. To this end, the IEL may have hardness that is greater than that of the skin system material, with an exemplary IEL formed of silicone with a hardness greater than 20 Shore A (e.g., 30, 40, 50 Shore A or harder) and with some embodiments being in the range of 20 to 100 Shore A and with one useful prototype having a hardness of 75 Shore A. Typically, the smaller the IEL is the more dense and rigid the material chosen to form it integrally with the skin system.

Figure 1:
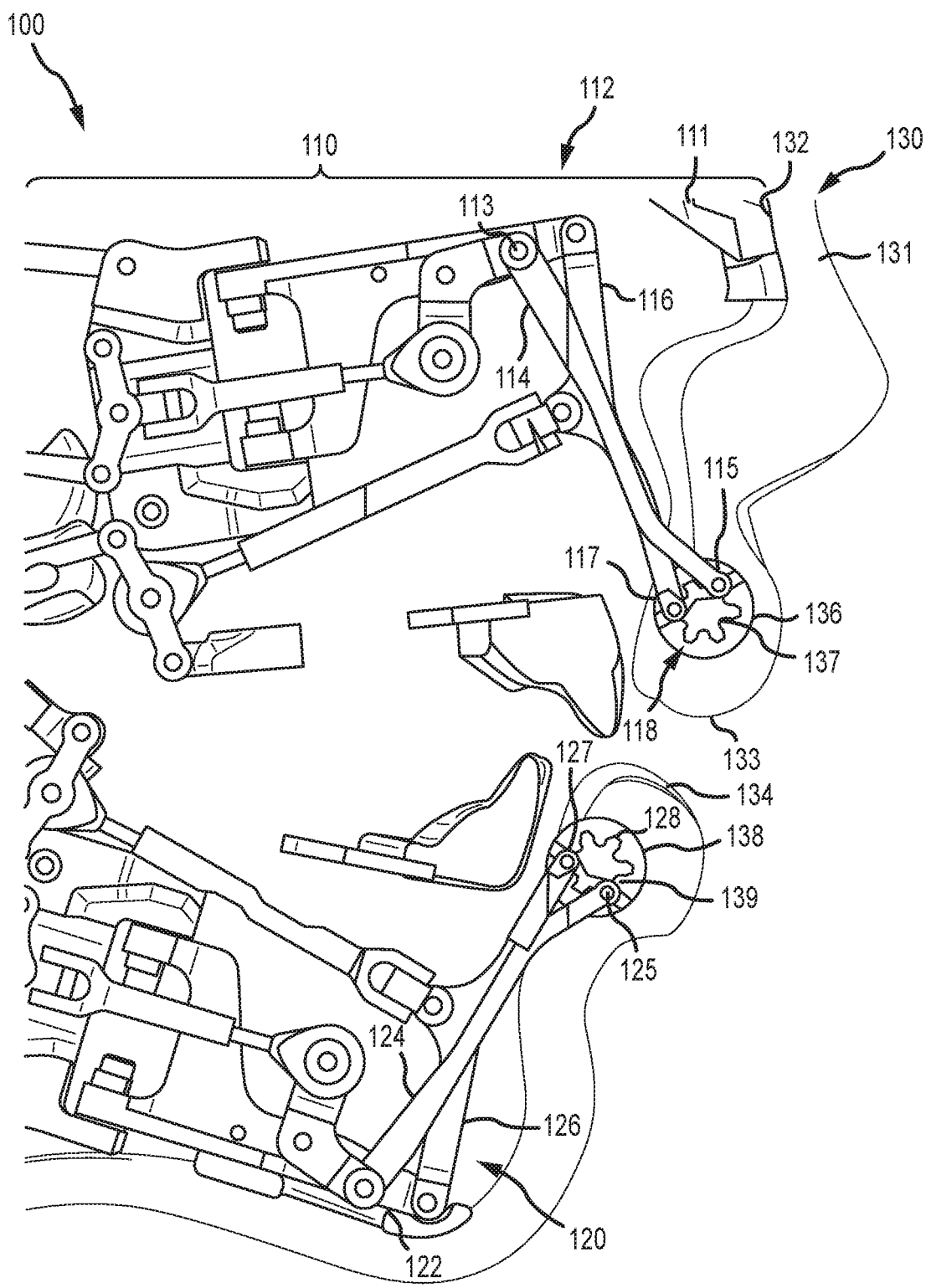
FIG. 1 is a partial side view of a prior art robot or robotic device showing, with a cutaway view, internal robotics used to actuate or animate a skin system or skin applied over and coupled with the robotics.
Figure 2:
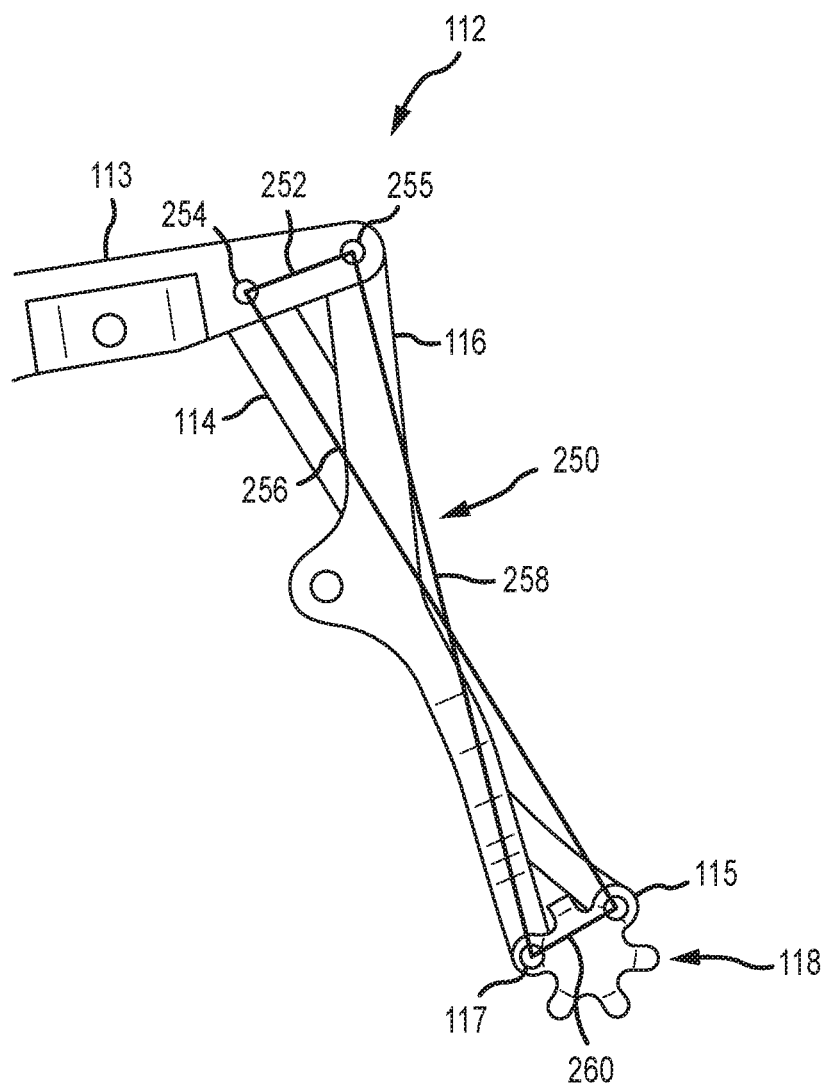
FIG. 2 shows a more detailed view of one of the mechanical linkages shown in FIG. 1 with an overlaying image or representation of a closed chain provided by the mechanical linkage.

In the past as seen in FIGS. 1 and 2, animatronic skin such as the material around a character's face was typically manipulated by mechanical linkages formed of rigid metal links/bars that form closed mechanical chains. These complete mechanisms contain one or more rigid attachment points where the flexible skin material is held. The skin was generally formed with several components of different hardness that were chemically bonded together. The area of the skin that interfaced with the mechanism was known as an elastomeric actuation point or piece (EAP) and was generally formed of material that was harder and more durable than the main skin material. As the mechanism moved, the EAP attached to one of its rigid links/bars also moved.

This type of skin material-linkage connection unfortunately is limited by the size and material strength of the combined mechanical links and EAPs. Animatronics and other robotic devices that are meant to be very realistic representations of human characters often have skin features that are too small to accommodate a traditional mechanical link and EAP combination. For example, the robot head 100 shown in FIG. 1 was much larger than a typical human head at 1.6 times an average human head size, which allowed use of the EAP and link combination in the lips that may not be useful in smaller sized robotic devices such as a human replication that is life size.

The new skin system with its IELs—and robotic device or robots including such skin systems—achieve the desired skin movement in a smaller package by replacing one or more of the mechanism links/bars with the flexible material of the IEL itself. The IEL, when installed to receive and connect with coupling elements of mechanical linkages, functions as both a semi-rigid link in the closed mechanism chain and an embedded attachment point for the flexible skin material. In one embodiment, the IEL contains two (or more) spaced apart cylindrical members or end walls that can be flexed open or further apart to allow the coupling member(s) (e.g., pivot pin(s)) to be inserted into the IEL and then released to return to at-rest positions (or shapes) so as to snap over the ends of the links of the mechanical linkage and support and connect with the coupling member(s), thereby closing the mechanism chain and providing rotational or bearing surfaces for the mechanism that previously would have been provided by a rigid link.

The size of the IEL typically is very small by necessity such as to fit within relatively small features of the skin system such as lips or eyebrows, and the IEL often is made from a flexible material such as silicone chosen to be harder or more rigid (or stiff) than the surrounding skin system material to which it is integrally bonded. Therefore, the IEL is able to keep its shape (or to keep its shape in the section of its body that includes the end walls and a section extending between and interconnecting the end walls) well enough to function like a rigid link of a mechanical linkage while also being flexible enough to all the skin to which it is attached and embedded in to move realistically with actuation of the mechanical linkage.

Figure 3A:
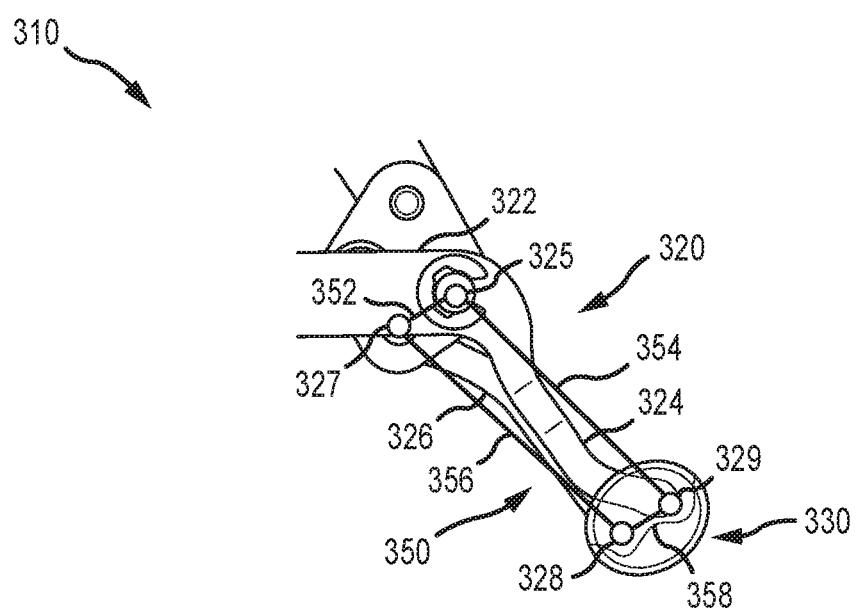
FIGS. 3A and 3B illustrate, respectively, portions of a robot or robotic device in an non-operating state and a driven or operating state, including its robotics, an exemplary mechanical linkage, and an IEL of the present description.
Figure 3B:
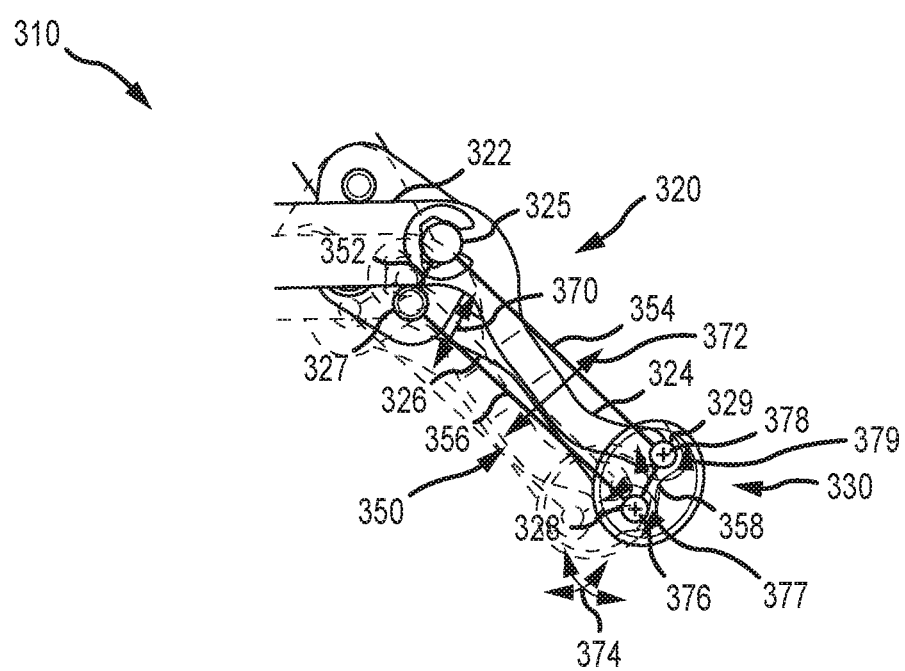

FIGS. 3A and 3B illustrate, respectively, portions of a robot or robotic device in a non-operating state and a driven or operating state, including its robotics 310, an exemplary mechanical linkage 320, and an IEL 330 of the present description. The robotics 310 generally include a driver or actuator selectively driving or actuating the mechanical linkage 320 as shown in FIG. 3B, which is shown to include the IEL 330 even though it should be understood that the IEL 330 is provided as an embedded part of a skin system not shown in FIGS. 3A and 3B but understood from FIG. 1 and following FIG. 4.

FIG. 3A shows that the mechanical linkage 320 includes a first or base link/bar 322 that pivotally supports second and third links/bars 324, 326 via pivot pins 325, 327 extending through ends of these links/bars 324, 326 as well as link/bar 322. These three links/bars 322, 324, and 326 are generally formed of metal or other materials to provide a rigid link or bar of the mechanical linkage 320. They form three chains or links 352, 354, 356 of a closed chain 350 allowing the mechanical linkage 320 to operate properly in response to operations of interconnected portions (e.g., a driver(s)) of the robotics 310.

Significantly, the mechanical linkage 320 further includes an IEL 330 that is pivotally connected to outer ends of the second and third links/bars 324, 326. This pivotal connection is achieved with coupling elements 328, 329 (e.g., pivot pins) in the outer ends of the links/bars 324, 326 being received and supported by the IEL 330 as to allow rotation (as shown with arrows 377, 379 in FIG. 3B) of the coupling elements about their rotation axes (shown at 376, 378 in FIG. 3B). The last link (or chain) 358 of the closed chain 350 of the mechanical linkage 320 is provided by the IEL 330 itself, and, as shown in FIG. 4 and described herein, the IEL 330 is part of the robot's flexible skin.

With the closed chain 350 provided by link/chain 358 (or by the IEL 330), the mechanical linkage 320 can be driven by a driver of the robotics 310 as shown with arrows 370, 372, 374 to animate or move a skin system that includes the IEL 330. As shown, the IEL 330 moves as part of the closed mechanism chain 350 in a way that is similar to—but, in many cases, more realistic than—a traditional rigid metal link (e.g., link 118 shown in FIG. 1). Note, the mechanism 320 does not work or function properly without the IEL 330 or until the coupling elements 328, 329 are inserted into the body of the IEL 330.

Figure 4:
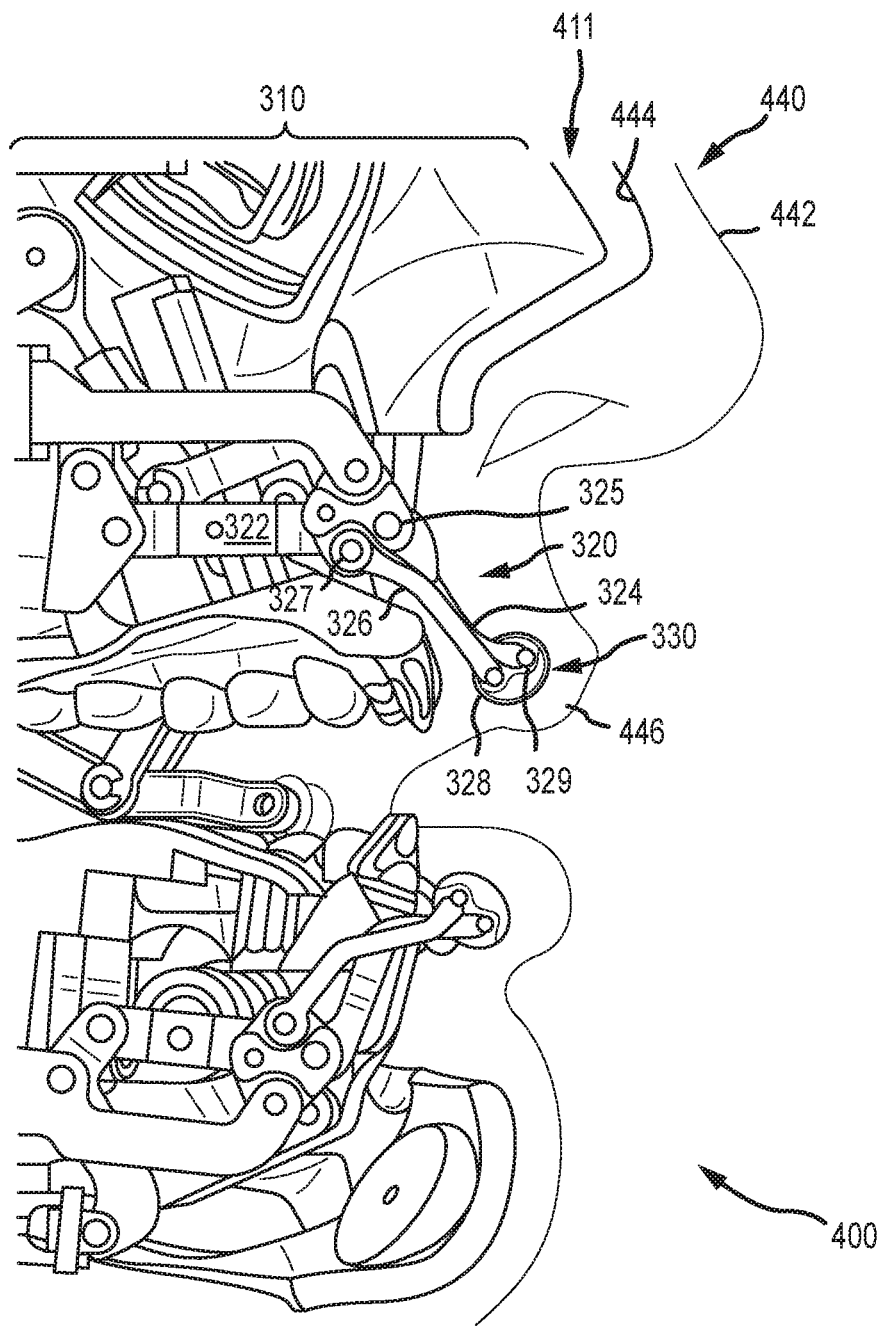
FIG. 4 is a partial side view similar to that of FIG. 1 but of a new robot or robotic device showing, with a cutaway of overlying skin view, internal robotics used to actuate or animate a skin system or skin applied over and coupled with the robotics via embedded IELs.

FIG. 4 is a partial side view similar to that of FIG. 1 but of a new robot or robotic device 400 showing, with a cutaway of overlying skin view, internal robotics 310 used to actuate or animate a skin system or skin 440 applied over and coupled with the robotics via embedded IELs including IEL 330 in an actuated portion (e.g., a lip of a face of a character) 446. The skin 440 is shown to have a layer or body of elastic or flexible material such as a rubber with its outer surface 442 facing away from the robotics 310 and with its inner surface 444 facing and typically contacting or abutting a shell 411. The shell 411 is used to house, support, and partially enclose the robotics 310 with openings through which all or portions of mechanical linkages including mechanical linkage 320 protrude.

Note, due to size reductions in the lip 446 compared with the lip 133 of the skin 130 in FIG. 1 (e.g., lip 133 is 1.5 to 2.0 times as large as lip 446), the traditionally designed EAP 136 with an inserted rigid link 118 was too large to fit into the lip 446 (e.g., of a typical human-sized figure). In contrast, the new IEL 330 that connects with the pivot pins 328, 329 is small enough to fit in and realistically actuate the smaller lip 446 via operations of the robotics 310 that drive movement of the mechanical linkage 320 that includes the IED 330 as a fourth link/bar. For example, the IED 330 may have a cross sectional diameter (when generally cylindrical in shape) in the range of 3 to 10 millimeters (or, of course, may be quite a bit larger if size is not a significant constraint) and with a similar length such as in the range of 5 to 20 millimeters.

Figure 5:
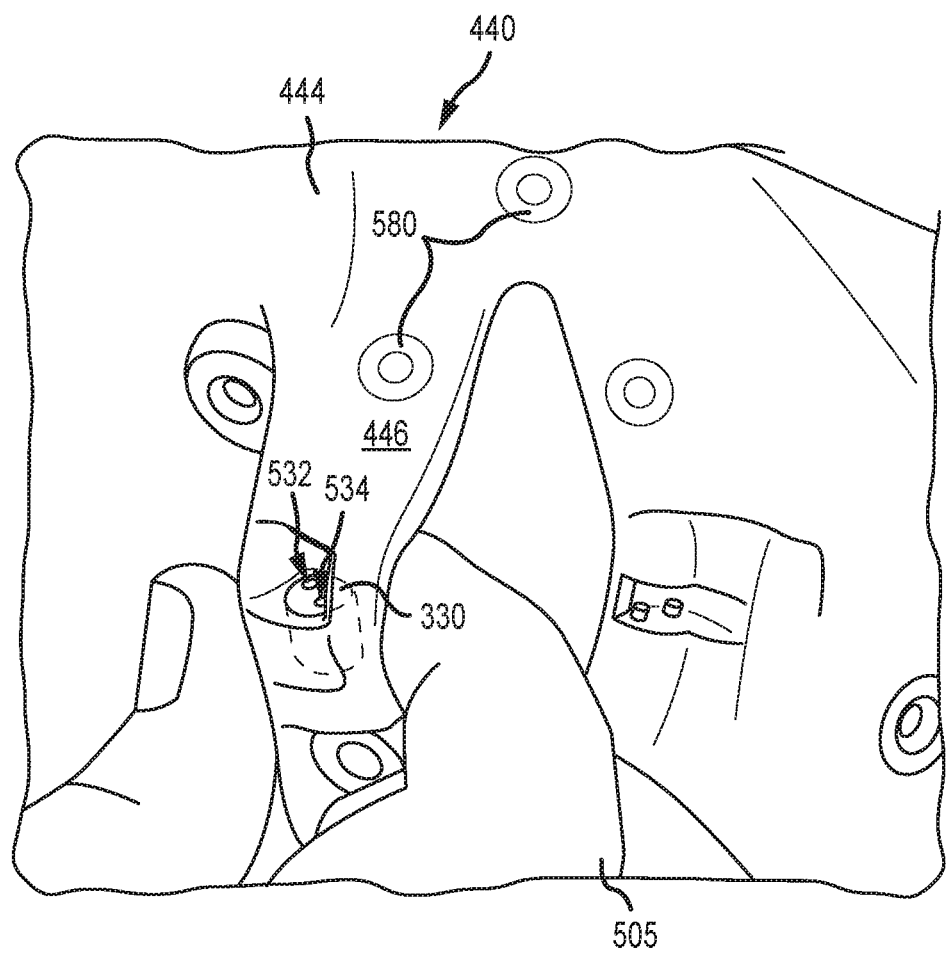
FIG. 5 shows a portion of the inner surface of the skin system or skin of FIG. 4 showing the embedded IEL in the lip of the skin system or skin (in this example)

FIG. 5 shows a portion of the inner surface of the skin system or skin 440 of FIG. 4 turned inside out to show the inner surface/side 444 of the skin 440. With this view, one can see the IEL 330 embedded in the lip 446 of the skin system or skin 440 (in this example, but an IEL may be provided in any part of the skin 440 that is to be moved by a mechanical linkage). The IEL 330 is bonded with the surrounding portions of the lip 446 as the IEL 330 is provided on a surface of a core prior to pouring and forming the skin 440 (as described in U.S. Pat. No. 8,568,642, which is incorporated herein in its entirety by reference).

As can be seen, a technician uses their fingers 505 to manipulate the flexible material of the lip 446 and the IEL 330 to expose the two spaced-apart holes 532, 534 in an end wall or portion of the body of the IEL 330 to facilitate insertion of two coupling elements of links of a mechanical linkage (not shown in FIG. 5 but may be pivot pins 328, 329 of mechanical linkage 320 of FIGS. 3 and 4). When the coupling elements are inserted into the holes 532, 534 and the skin 440 is applied over the robotics and its shell, the driving portions of robotics (e.g., robotics 310) are attached or connected to the skin 440 in lip 446, and the material of the body of the IEL 330 provides a final link (of mechanical linkage 320) to provide a closed chain allowing operations of the linkage to animate or move the lip 446. The holes 532, 534 provide bearing surfaces for the pivotable pins 328, 329 and also define where the rotational axes of pins 328, 329 will be located in the robot 400.

Figure 6:
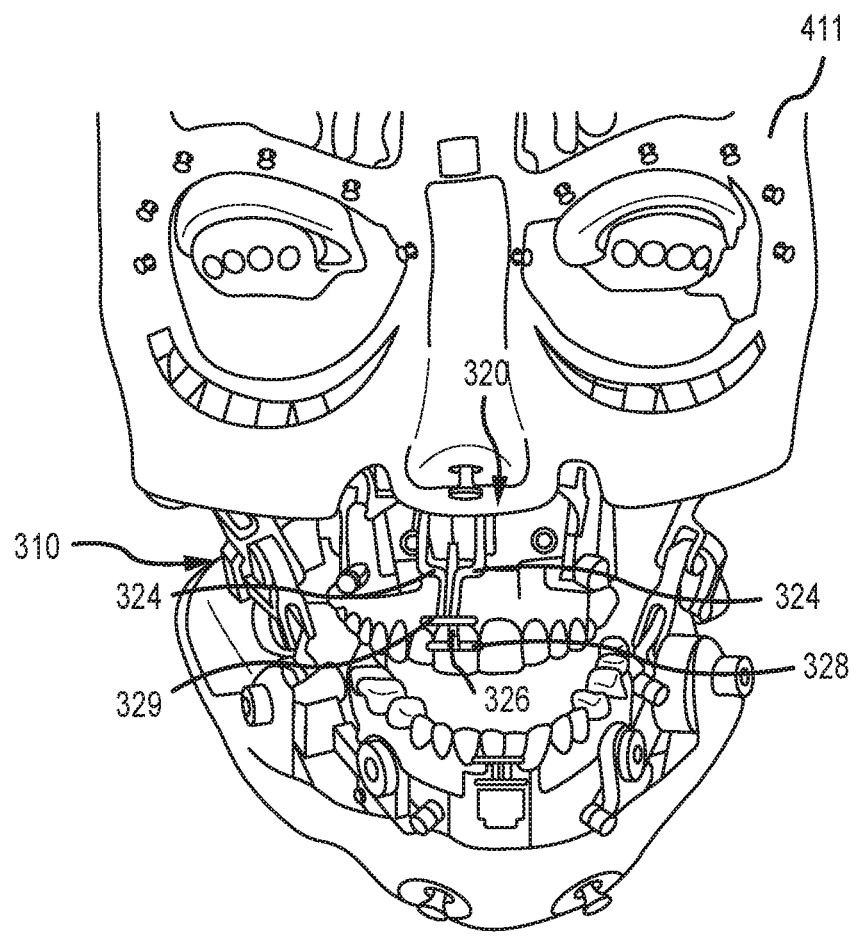
FIG. 6 is a front view of the robot of FIG. 4 with the skin removed to reveal the shell and portions of the robotics including the coupling elements of a mechanical linkage that is connected to an IEL in a skin as shown in FIG. 4.
Figure 7:
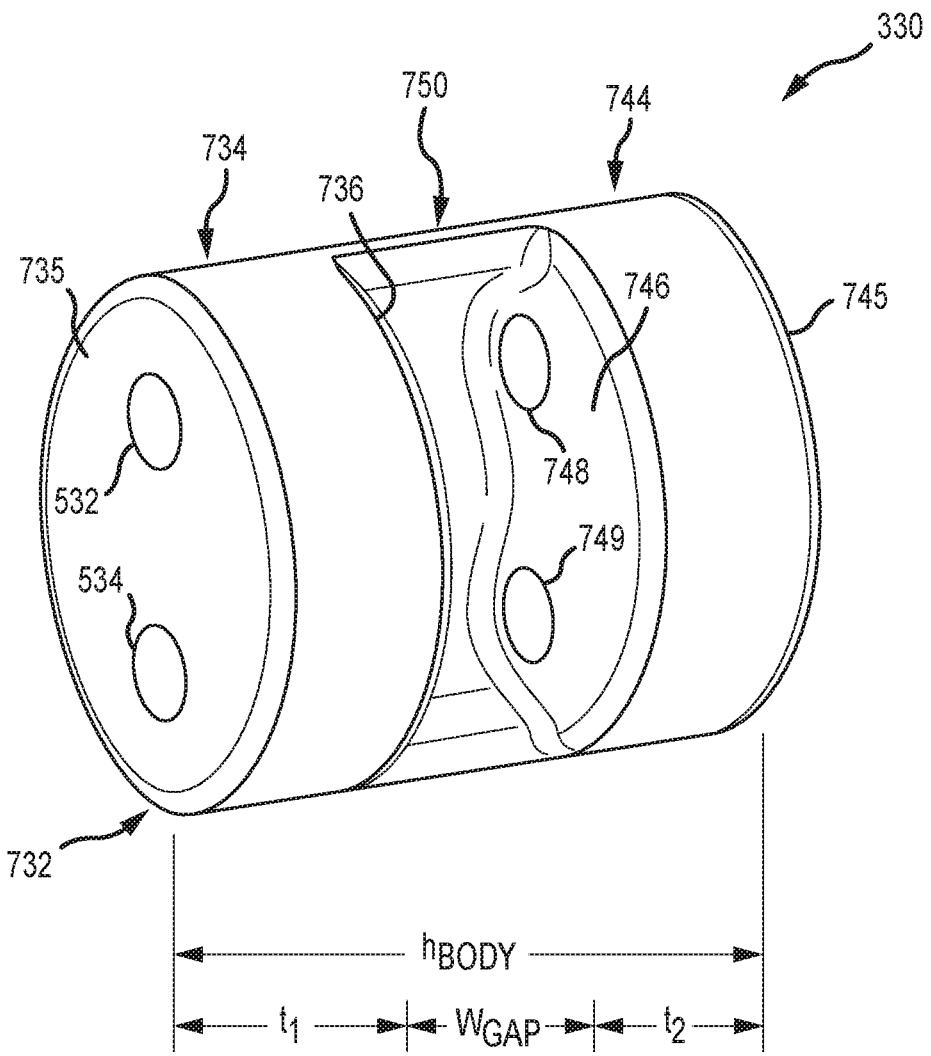
FIGS. 7-10 provide, respectively, a front side perspective view, a rear side perspective view, a front view, and an end view of an IEL used in the skin of FIGS. 4 and 5.
Figure 8:
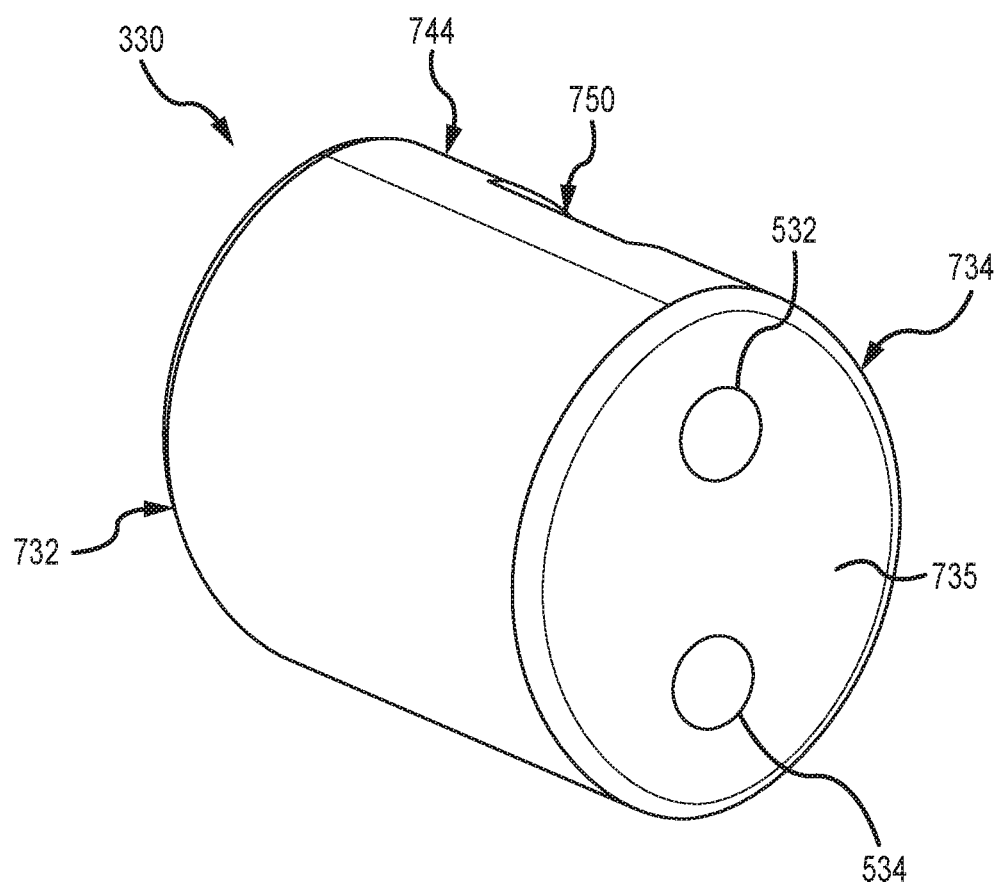
Figure 9:
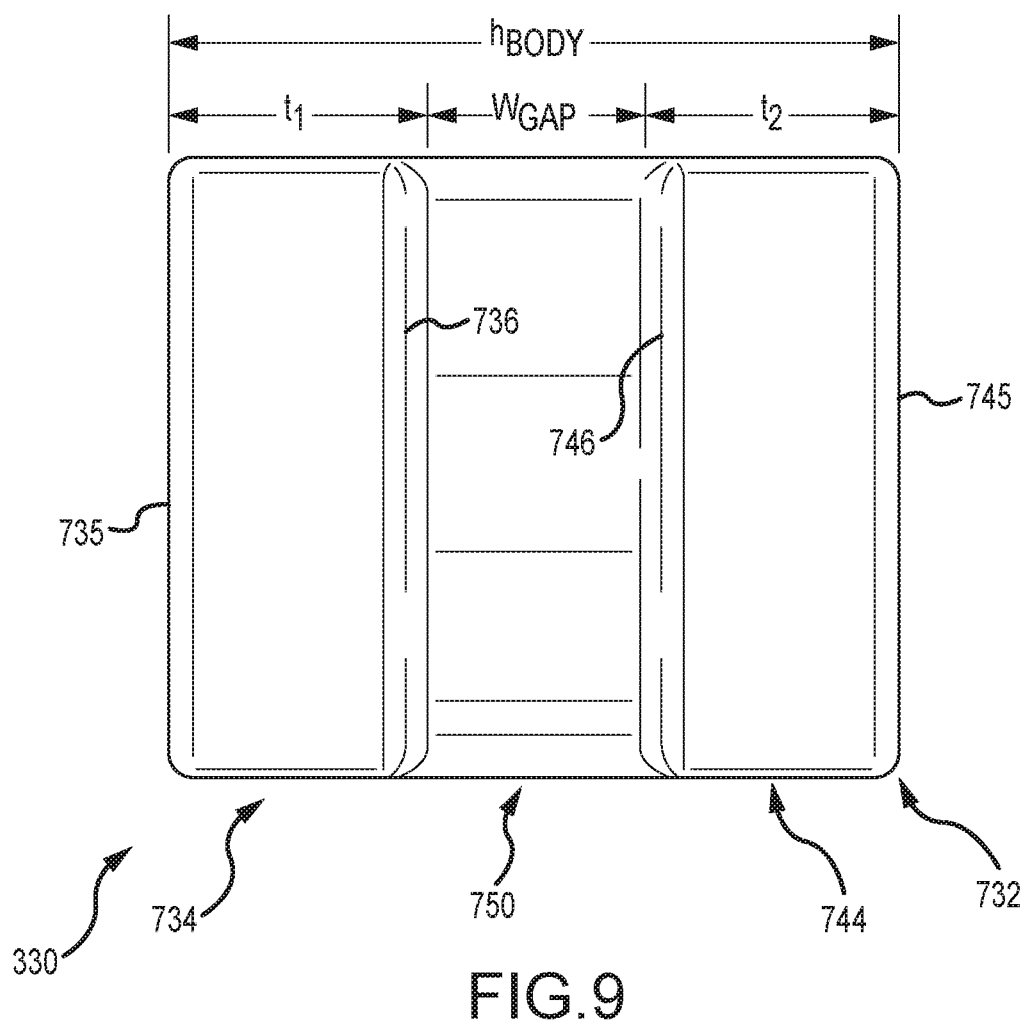

FIG. 6 is a front view of the robot 400 of FIG. 4 with the skin 440 removed to reveal the shell 411 and portions of the robotics 310. Particularly, FIG. 6 shows the coupling elements 328, 329 (elongated pivot pins in this example) supported on the ends of links 326 and 324, respectively, of the mechanical linkage 320. As shown in FIG. 4, these pins 328, 329 are connected to the IEL 330 embedded in the skin 440 when the robot 400 is assembled so as to provide a closed chain for mechanical linkage 320 and to couple the linkage 320 to the skin 440 so the skin material of lip 446 moves with actuation/driving by the linkage 320 of robotics 310. The links/bars 324, 326 are free to move on their pivotal couplings to link/arm 322 until the IEL 330 is attached to pins 328, 329, which closes the mechanism chain.

The specific configuration for an IEL for a skin may vary to practice the invention, with its number of holes, spacing between holes, size of holes, and other parameters such as material, body and wall sizes, and so on typically being chosen to suit a particular mechanical linkage, its number and location of its links, the number, size, and configuration of the coupling elements, and so on as well as to achieve a desired rigidity (to properly function as a link of a mechanical linkage and to move realistically with adjoining skin). However, it may be useful to understand these wide variations by describing the IEL 330 in greater detail as one proven useful example configuration for an IEL of a skin system of the present description.

Figure 10:
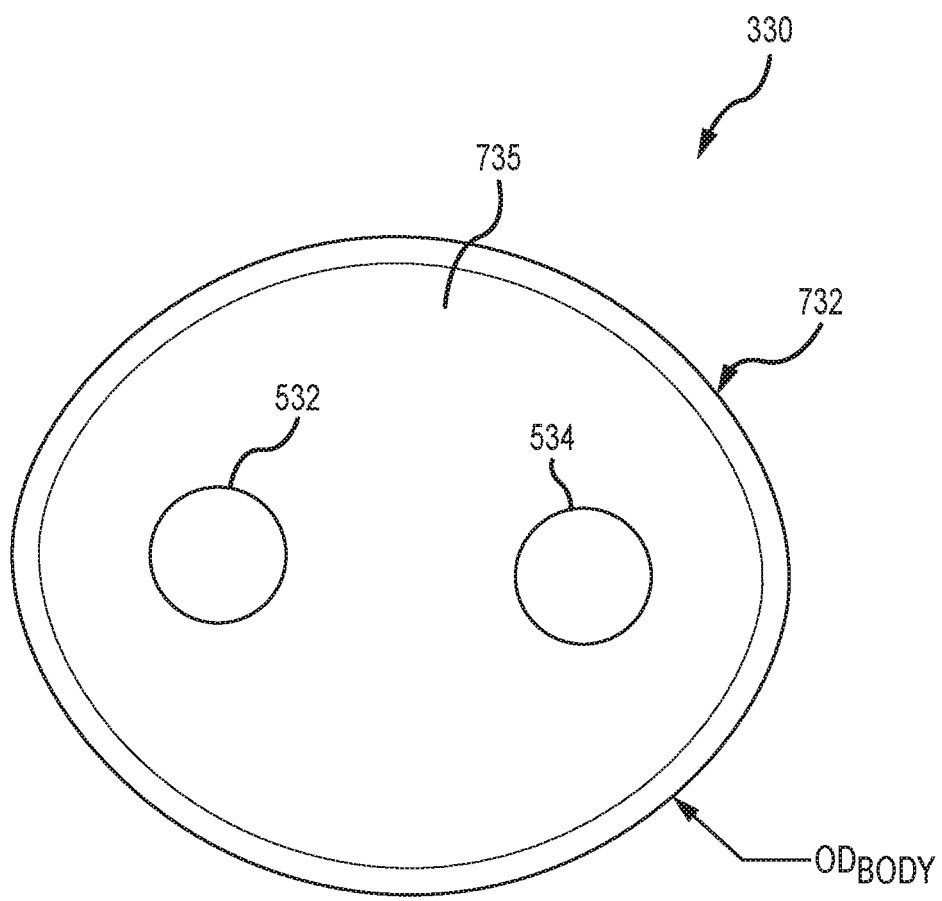

FIGS. 7-10 provide, respectively, a front side perspective view, a rear side perspective view, a front view, and an end view of the IEL 330 embedded in the skin 440 shown in FIGS. 4 and 5. The IEL 330 has a body 732 that is generally cylindrical in shape with an outer diameter, OD, and a height, $h_{body}$, chosen to suit the particular skin (e.g., size and shape of lip 446 of skin 440) and coupling elements of a mechanical linkage (e.g., pivot pins 328 and 329 of linkage 320). For example, the OD may be in the range of 3 to 5 mm or the like while the height, $h_{body}$, may be chosen to be equal to or some amount less than (e.g., 75 to 90 percent of pin length) the length of the pins 328, 329 such as in the range of 5 to 10 mm or the like. As shown in FIG. 10, the body 732 may not be perfectly circular in cross sectional shape (e.g., more elliptical in shape or football shaped) and may take other cross sectional shapes such as rectangular.

The body 732 is shown to be formed of two end walls 734 and 744 each with a generally circular (or elliptical) cross sectional shape and with a thickness (as measured between outer surfaces 735, 745 and inner surfaces 736, 746) $t_1$ and $t_2$. Through holes 532, 534, 748, 759 are provided in the end walls 734, 744, respectively, for receiving and supporting opposite ends of two pivot pins (e.g., pins 328, 329 of FIG. 4), with these holes 532, 534, 748, 759 typically having a diameter that matches or is a small amount larger than the outer diameter of the pivot pins 328, 329. The thicknesses, t1 and t2, of the end walls 734, 744 are typically equal to each other and are chosen so that a desired length of a received pivot pin is pivotally supported on the bearing surfaces within the holes 532, 534, 748, 759 (such as to have one fourth to one third (or more) of each pivot pin supported by the body 732 within the holes 532, 534, 748, 749).

The body 732 further includes a connecting section 750 with a width, $w_{gap}$, chosen to define a gap between the two inner surfaces 736 and 746 of the end walls 734 and 744 (such as one quarter to one half of the body height, $h_{body}$, with one third used in some embodiments). The connecting section 750 is shown to be semicircular in cross sectional shape and to extend a fraction of the outer diameter, OD, of the body (such as 180 to 270 degrees or the like) so that the body 732 is rigid enough even when made of a flexible material such as a silicone (with a hardness greater than that of nearby skin material such as 70 to 80 Shore A hardness) to function as a link/bar of a mechanical linkage. The connecting section 750 is also sized so as to allow the gap to be opened up to spread the surfaces 736 and 746 of the end walls 734 and 744 apart an adequate amount to allow insertion of pivot pins into the holes 532, 534, 748, 749, at which point a technician would release the IEL 330 to allow the walls 734, 744 snap back into their at-rest configurations or states to retain the pins within the body 732 (as seen for pins 328, 329 in FIG. 4). The connecting section 750 is also sized to allow for adequate space for links 324 and 326 to move when actuated as part of linkage 320 of robotics 310 without colliding with IEL 330.

Figure 11:
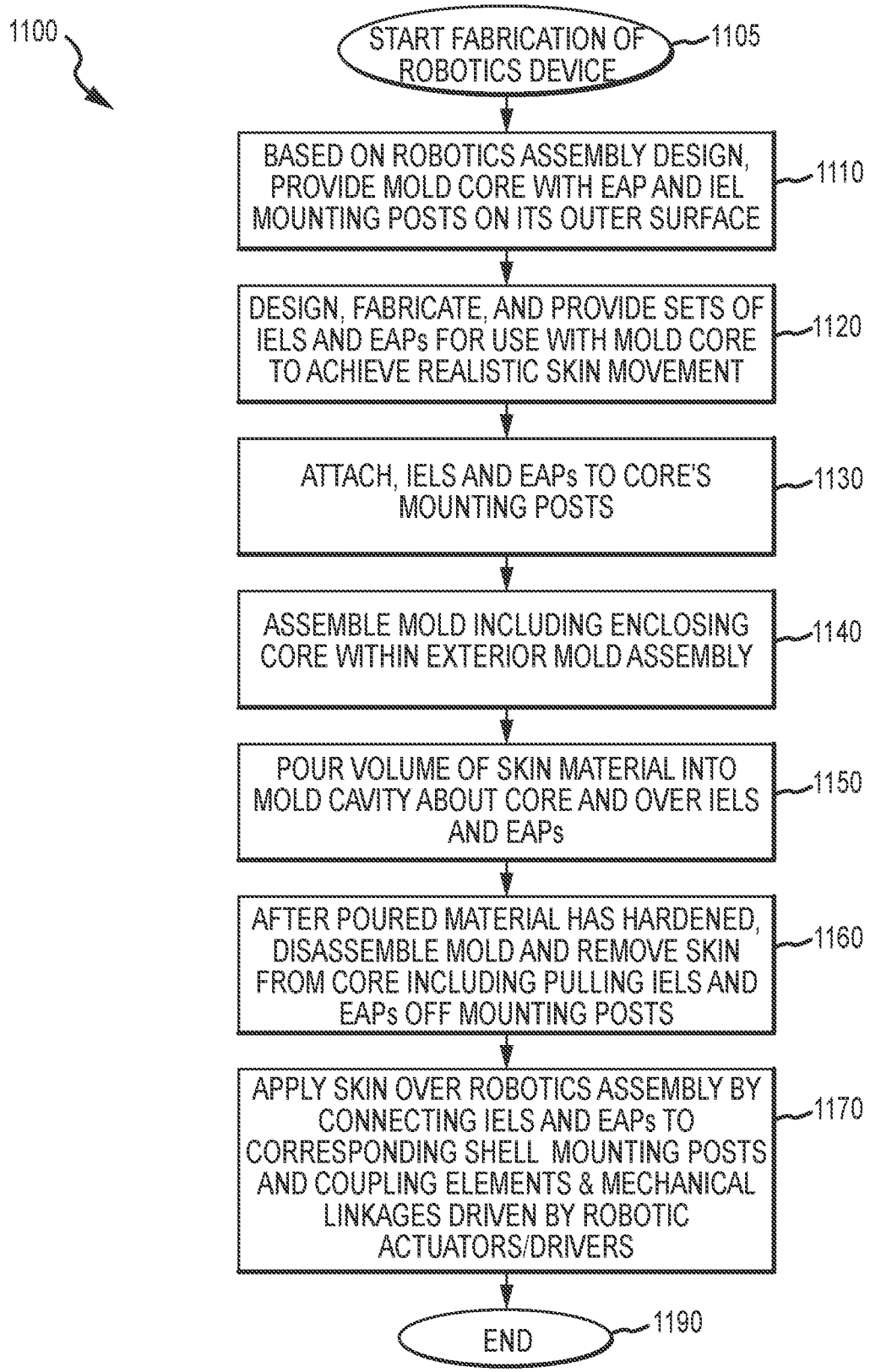
FIG. 11 is a flow diagram for a process or method of assembling a product or device, such as a robotic character (in this non-limiting example, a robotic-actuated head), having a robotics assembly (or simply "robotics") and an exterior artificial skin or skin system with integrally formed IELs (as well as EAPs).

FIG. 11 illustrates a method 1100 of fabricating a robotics device such as a robotic head 400 as shown in FIG. 4 in which it is very desirable to have realistic and natural skin movement driven by underlying robotics (such as robotics 310), such as actuators or drivers that are coupled/connected to a skin (such as skin 440). The method 1100 starts at 1105 such as with selection of an object or character to be modeled with a robotics device. For example, it may be desirable to provide a robotics device that can be manipulated to simulate a human speaking or singing, and it may be desirable that the skin and underlying robotics closely replicate a well-known person such as a national leader, a music star, a movie character/actor, or the like. In such cases, the skin and robotics are specially designed to provide animation that replicates the particular bodily features of the person as well as their peculiar mannerisms and facial movements, e.g., a particular way of raising an eyebrow, a manner of frowning or smiling, and so on.

In such cases, the method 1100 may start at 1105 with creating a sculpture, such as from clay or other moldable/shapeable materials, to represent the exterior skin shape (e.g., a person's face, a character from a movie, and so on). The sculpture is then molded, and sheet wax or a layer of clay is laid by hand into this exterior mold to define a desired thickness for the exterior skin layer. An interior core is then fabricated by hand such as by using fiberglass and resin. In other embodiments, sculpture is scanned to create a 3D digital model of the desired skin, and this 3D digital model is used to design a robotic assembly including an outer shell for supporting the skin and also for providing access points/ports for the robotic drivers/actuators. Fiberglass or a similar material is used to form an exterior mold assembly from the core that defines the outer surfaces of the skin, and hard shells, e.g., fiberglass shells to support the skin when the robot is later assembled and to house the robotics, are then created from this core mold. An exterior skin can now be formed by pouring a rubber or other flexible material into the gap between the exterior mold (with the sheet wax removed) and the core mold. After it is set, the skin can be removed from the molds and placed on the supporting or hard shell(s) and attached to portions of the robotics.

Specifically, the method 1100 includes the step 1110 of using the above-described design of the robotics assembly to then provide the mold core. The mold core is fabricated based on the design of the outer hard shell/housing for the robotics as this is useful for defining the core's outer surface shape and/or topography as well as defining a plurality of connection points or locations for attaching the inner surfaces of the skin to the robotics outer shell/housing (for EAPs) and robotics' mechanical linkages (or their coupling elements such as pivot pins for IELs) In other words, the core in step 1110 is fabricated to provide precisely located connection posts both for skin-to-robotics shell coupling (with EAPs) and for skin-to-robotics coupling (e.g., locations where force or load will be applied to the skin to move or animate it during operation of the covered/underlying robotics assembly by links of a mechanical linkage with an IEL used to connect with and provide a final link in all or some of the mechanical linkages). Refer to FIG. 2 of incorporated U.S. Pat. No. 8,568,642 for an exemplary a portion (e.g., the face or front portion) of a mold core that may be provided according to steps 1105 and 1110 of the method 1100 with connectors in the form of posts or other configurations provided for each IEL and each EAP (e.g., some of the EAP mounting posts would be replaced with mounting components for the new IELs taught herein).

The method 1100 continues at 1120 with designing, fabricating, and providing a set of IELs (and EAPs in most cases) for use with a core fabricated and provided in step 1110. The IELs are designed to provide realistic skin movement, and the IELs work in conjunction other links of a mechanical linkage in the robotics to achieve desired movement or animation of the skin containing these IELs in response to application of forces by robotic actuators/drivers connected to one or more of the links/bars of the mechanical linkages. In step 1130, the IELs (and EAPs if included) are attached to the core's mounting posts or other mounting components (if used for IELs that are configured for receiving pivot pins or other coupling elements of a mechanical linkage).

The material chosen for the IELs (and EAPs if included) may also vary to practice the method 1100 and form a useful skin. The material may be chosen to be a material that is compatible with the material used to form the skin such that when the skin-forming material poured over the IELs (and EAPs) and allowed to harden (see step 1150 of method 1100) it integrally bonds with the skin material. In this manner, the adjoining skin either is held stationary by the EAP or moves with the IEL acting as a final link of a mechanical linkage to provide a closed chain. In many cases, the material for the IELs is chosen to suit its "rigid" link function with a hardness that exceeds, and, in some cases, is substantially greater than the surrounding skin being used for the force-distributing IELs (e.g., to increase the durability of these load bearing surfaces/components). For example, some IELs are formed of vulcanized rubber and/or a higher hardness silicone such as a silicone rubber with a 50 to 60 Durometer or greater hardness.

Referring again to FIG. 11, the method 1100 continues at step 1140 with assembling the mold including the core with IELs and EAPs from step 1130. The step 1140 includes providing an exterior mold assembly with inner surfaces defining exterior topography of a skin system, and the step 1140 includes enclosing the core within the exterior mold assembly. This results in a cavity associated with the skin to be formed to be defined between the inner surfaces of the exterior mold components and the exterior surface of the core (e.g., the inner surfaces of the exterior mold components are at an offset distance defining the skin thickness from the exterior surface of the mold).

At step 1150, a volume of liquid skin-forming material (such as an elastomer such as silicone or another rubber) is poured into the mold cavity. This liquid material covers the surfaces of the inner core including covering all of the IELs and EAPs supported on the core's surface. In step 1160, the material is allowed to harden so as to create the skin or skin system. During such hardening, the IELs and EAPs bond with the poured material such that the IELs and EAPs are now an integral part of the skin. Hence, post-skin formation gluing and other fabrication steps are not required.

In step 1160, the mold is disassembled, and the formed skin with embedded IELs and integral EAPs is peeled off or removed from the core, which involves pulling each IEL and EAP off of its corresponding mounting post/device. The method 1100 continues at 1170 with assembling the skin on the robotic assembly by applying the skin over it and connecting IELs and EAPs to corresponding shell mounting posts and coupling elements and mechanical linkages driven by robotic actuators/drivers. The method 1100 then ends at 1190, and the robotics assembly may be operated to animate the skin (e.g., skin 440 of FIG. 4) in a realistic manner via the IELs Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A skin-covered robotic apparatus, comprising:
a robotics assembly including a mechanical linkage comprising a first link with a first coupling element and a second link with a second coupling element; and
a skin system comprising a layer of flexible material with an outer surface and an inner surface,
wherein the skin system is applied over the robotics assembly with the inner surface facing the mechanical linkage,
wherein the skin system further comprises an integral elastomeric link (IEL) with a body embedded in and integrally bonded to the flexible material of the layer of the skin system,
wherein the first and second links are rigid,
wherein the first and second coupling elements are pivot pins,
wherein the first and second coupling elements are connected to the body of the IEL, and
wherein the body of the IEL provides a third link of the mechanical linkage.

2. The apparatus of claim 1, wherein the mechanical linkage has a closed chain when the first and second coupling elements are connected to the body of the IEL.

3. The apparatus of claim 1, wherein the body of the IEL is formed of an elastomeric material.

4. The apparatus of claim 3, wherein the body has a hardness greater than a hardness of the flexible material of the layer of the skin system.

5. The apparatus of claim 4, wherein the hardness is greater than 20 Shore A.

6. The apparatus of claim 3, wherein the elastomeric material is silicone.

7. The apparatus of claim 1, wherein the body of the IEL comprises two spaced apart end walls each with a pair of spaced apart holes for receiving ends of the pivot pins.

8. The apparatus of claim 7, wherein the pivot pins are pivotally supported within the holes of the end walls, whereby inner surfaces of the holes in the end walls are bearing surfaces for the pivot pins during operations of the robotics assembly to drive the mechanical linkage and move the skin system.

9. The apparatus of claim 7, wherein the end walls are each cylindrically shaped with a thickness greater than about 25 percent of a length of the pivot pins.

10. The apparatus of claim 9, wherein the body includes a connecting portion extending between edges of the end walls, wherein a gap is formed in the body between inner surfaces of the end walls, wherein the gap is exposed on the inner surface of the skin system for receiving the pivot pins, and wherein the gap has a width greater than about 25 percent of the length of the pivot pins.

11. The apparatus of claim 9, wherein the body has a length as measured between outer surfaces of the end walls that is less than about 9 millimeters.

12. A skin-covered robotic apparatus, comprising:
robotics with a driver adapted to drive a mechanical linkage, wherein the mechanical linkage includes a first rigid link with a first coupling element on an unattached end and a second rigid link with a second coupling element on an unattached end; and
a skin comprising a thickness of elastomeric material with an outer surface and an inner surface,
wherein the skin is applied over the robotics assembly with the inner surface facing the mechanical linkage,
wherein the skin further comprises an integral elastomeric link (IEL) with a body embedded in and integrally bonded to the elastomeric material the skin,
wherein the first and second coupling elements are pivotally coupled with the body of the IEL, and
wherein the body of the IEL provides a third link of the mechanical linkage and moves with the first and second links in response to the driver operating to drive the mechanical linkage, whereby the mechanical linkage has a closed chain when the first and second coupling elements are connected to the body of the IEL.

13. The apparatus of claim 12, wherein the body of the IEL is formed of an elastomeric material, wherein the body has a hardness greater than a hardness of the flexible material of the layer of the skin system, and wherein the first and second coupling elements are pivot pins.

14. The apparatus of claim 13, wherein the body of the IEL comprises two spaced apart end walls each with a pair of spaced apart holes for receiving ends of the pivot pins and wherein the pivot pins are pivotally supported within the holes of the end walls, whereby inner surfaces of the holes in the end walls are bearing surfaces for the pivot pins during operations of the robotics assembly to drive the mechanical linkage and move the skin system.

15. The apparatus of claim 14, wherein the end walls are each cylindrically shaped with a thickness greater than about 25 percent of a length of the pivot pins, wherein the body includes a connecting portion extending between edges of the end walls, wherein a gap is formed in the body between inner surfaces of the end walls, wherein the gap is exposed on the inner surface of the skin system for receiving the pivot pins, and wherein the gap has a width greater than about 25 percent of the length of the pivot pins.

16. A skin-covered robotic apparatus, comprising:
a mechanical linkage comprising a first link with a first coupling element and a second link with a second coupling element; and a skin system comprising a layer of flexible material with an outer surface and an inner surface, wherein the skin system further comprises an integral elastomeric link (IEL) with a body embedded in and integrally bonded to the flexible material of the layer of the skin system, wherein the first and second coupling elements are connected to the body of the IEL, wherein the body of the IEL provides a third link of the mechanical linkage, wherein the body of the IEL comprises two spaced apart end walls each with a pair of spaced apart holes in the inner surface providing access to passageways in the body of the IEL for receiving the first and second coupling elements, and wherein the first and second coupling elements are pivotally supported within the passageways, whereby inner surfaces of the passageways provide bearing surfaces for the first and second coupling elements during operations of the robotics assembly to drive the mechanical linkage and move the skin system.

17. The apparatus of claim 16, wherein the mechanical linkage has a closed chain when the first and second coupling elements are connected to the body of the IEL, wherein the body of the IEL is formed of an elastomeric material, and wherein the body has a hardness greater than a hardness of the flexible material of the layer of the skin system.

18. The apparatus of claim 16, wherein the first and second links are rigid and wherein the first and second coupling elements are pivot pins and wherein the end walls are each cylindrically shaped with a thickness greater than about 25 percent of a length of the pivot pins.

19. The apparatus of claim 16, wherein the body includes a connecting portion extending between edges of the end walls, wherein a gap is formed in the body between inner surfaces of the end walls, and wherein the gap is exposed on the inner surface of the skin system for receiving the first and second coupling elements.

* * * * *